United States Patent
Hazelton et al.

(10) Patent No.: US 7,770,692 B2
(45) Date of Patent: Aug. 10, 2010

(54) ENGINE ACOUSTIC TREATMENT

(75) Inventors: Gary J. Hazelton, White Lake, MI (US); Thomas Richard Durkin, Oxford, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 70 days.

(21) Appl. No.: 12/100,056

(22) Filed: Apr. 9, 2008

(65) Prior Publication Data

US 2009/0071747 A1  Mar. 19, 2009

Related U.S. Application Data

(60) Provisional application No. 60/972,285, filed on Sep. 14, 2007.

(51) Int. Cl.
E04B 1/82 (2006.01)
E04H 17/00 (2006.01)
F02B 77/00 (2006.01)
F02B 77/04 (2006.01)
F02B 77/13 (2006.01)
F01M 9/10 (2006.01)

(52) U.S. Cl. ............... 181/290; 181/204; 181/210; 181/284; 123/90.38; 123/195 C; 123/198 E

(58) Field of Classification Search ........... 181/290, 181/204, 284, 106, 210; 123/195 C, 198 E, 123/90.38; 29/592
See application file for complete search history.

(56) References Cited

U.S. PATENT DOCUMENTS

| | | | | |
|---|---|---|---|---|
| 4,369,744 A * | 1/1983 | Kubozuka et al. | ........ | 123/198 E |
| 4,395,982 A * | 8/1983 | Moller | ........ | 123/195 C |
| 4,471,731 A * | 9/1984 | Kasting et al. | ........ | 123/90.38 |
| 5,129,375 A * | 7/1992 | Takane et al. | ........ | 123/90.31 |
| 5,323,740 A * | 6/1994 | Daily et al. | ........ | 123/90.38 |
| 5,329,898 A * | 7/1994 | Nelson et al. | ........ | 123/195 C |
| 5,375,569 A * | 12/1994 | Santella | ........ | 123/90.38 |
| 5,636,607 A * | 6/1997 | Sattler et al. | ........ | 123/195 C |
| 5,868,109 A * | 2/1999 | Kunzel et al. | ........ | 123/90.38 |
| 6,085,709 A * | 7/2000 | Freese | ........ | 123/90.38 |
| 6,378,469 B1 * | 4/2002 | Hiranuma et al. | ........ | 123/41.56 |
| 6,419,535 B1 * | 7/2002 | Herrera | ........ | 440/77 |
| 6,834,634 B2 * | 12/2004 | Lawrence | ........ | 123/195 C |
| 6,951,263 B2 * | 10/2005 | Blomeling et al. | ........ | 181/204 |
| 7,029,013 B2 * | 4/2006 | Yajima et al. | ........ | 277/637 |
| 7,070,848 B2 * | 7/2006 | Campbell | ........ | 428/137 |
| 7,556,002 B2 * | 7/2009 | Jialanella et al. | ........ | 123/90.38 |
| 2003/0010566 A1 * | 1/2003 | Miyakawa et al. | ........ | 181/204 |

(Continued)

FOREIGN PATENT DOCUMENTS

EP   1695872 A1   8/2006

*Primary Examiner*—Jeffrey Donels
*Assistant Examiner*—Christina Russell
(74) *Attorney, Agent, or Firm*—Quinn Law Group, PLLC

(57) ABSTRACT

An example embodiment of an acoustic treatment for an engine having at least one engine component extending substantially therefrom includes a base layer having a first base surface and an opposing second base surface. The first base surface is configured to mate with an exterior surface of the engine. The example embodiment also includes a secondary layer having a secondary layer mating surface and an opposing secondary layer outer surface. The secondary layer mating surface is configured to mate with the second base surface at a mating interface. The interface provides a pass-through location for the at least one engine component.

19 Claims, 4 Drawing Sheets

U.S. PATENT DOCUMENTS

| | | | |
|---|---|---|---|
| 2004/0075290 A1* | 4/2004 | Campbell | 296/39.3 |
| 2004/0188165 A1* | 9/2004 | Miller et al. | 180/291 |
| 2005/0092268 A1* | 5/2005 | Girard | 123/41.86 |
| 2005/0133302 A1* | 6/2005 | Pfaffelhuber et al. | 181/293 |
| 2006/0073310 A1* | 4/2006 | Winkler | 428/158 |
| 2007/0056548 A1* | 3/2007 | Hazelton et al. | 123/195 C |
| 2008/0276901 A1* | 11/2008 | Miller et al. | 123/195 C |
| 2009/0056668 A1* | 3/2009 | Hazelton | 123/198 E |
| 2009/0194063 A1* | 8/2009 | Rice et al. | 123/198 E |

* cited by examiner

ENGINE ACOUSTIC TREATMENT

CROSS-REFERENCE TO RELATED APPLICATIONS

This application claims the benefit of U.S. Provisional Application 60/972,285, filed Sep. 14, 2007, which is hereby incorporated by reference in its entirety.

TECHNICAL FIELD

The present invention relates generally to internal combustion engines, and more particularly to an acoustic treatment for an internal combustion engine.

BACKGROUND OF THE INVENTION

Vehicle internal combustion engines (ICEs) include a variety of moving parts that create noise during engine operation. As examples, fuel system noise, combustion noise, and mechanical noise all potentially radiate from an engine's cam cover area. High combustion pressures, high fuel system pressures, piezo-electric injector noise, and/or high part clearances (particularly in diesel engines) may increase noise levels in an engine, which may make it more difficult to attenuate fuel system noise, combustion noise, and mechanical noise. As an example, noise may be created when combustion pressures having a high rate of pressure change result in large dynamic loads on engine structures. Further, ICEs are often equipped with engine components that extend through particularly noisy areas of the engine, the placement of which generally increases the difficulty associated with designing and executing an efficient engine acoustic treatment.

SUMMARY OF THE INVENTION

An example embodiment of an acoustic treatment for an engine. The engine has at least one engine component extending substantially therefrom. The acoustic treatment includes a base layer with a first base surface and an opposing second base surface. The first base surface is configured to mate with an exterior surface of the engine. The example acoustic treatment also includes a secondary layer having a secondary layer mating surface and an opposing secondary layer outer surface. The secondary layer mating surface is configured to mate with the second base surface at a mating interface. The mating interface provides a pass-through location for the at least one engine component.

The above features and advantages of the present invention will be readily apparent from the following detailed description of the preferred embodiments and best modes for carrying out the present invention when taken in connection with the accompanying drawings.

DESCRIPTION OF THE PREFERRED EMBODIMENTS

Embodiment(s) of the system and method disclosed herein advantageously provide an acoustic treatment for an engine, such as an internal combustion engine. The disclosed embodiment(s) advantageously reduce noise emissions from the engine. More specifically, acoustic sealing, as provided by embodiment(s) of the system and method, attenuate fuel system "tic," combustion noise, and/or mechanical noise. It is believed that such a method and/or system may provide for improved vehicle performance and/or operator satisfaction by limiting the amount of noise emitted from the engine.

Figure 1:
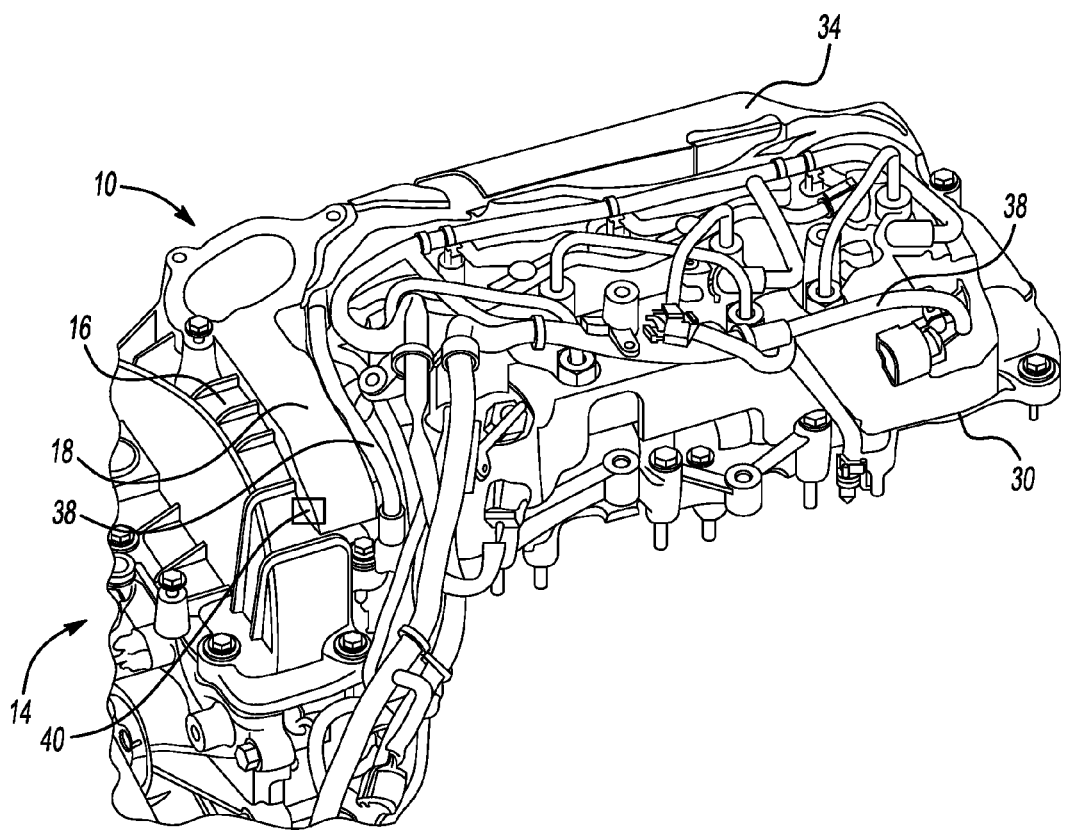
FIG. 1 is a perspective view of an embodiment of the base layer of the present invention mated with a portion of an internal combustion engine.
Figure 2:
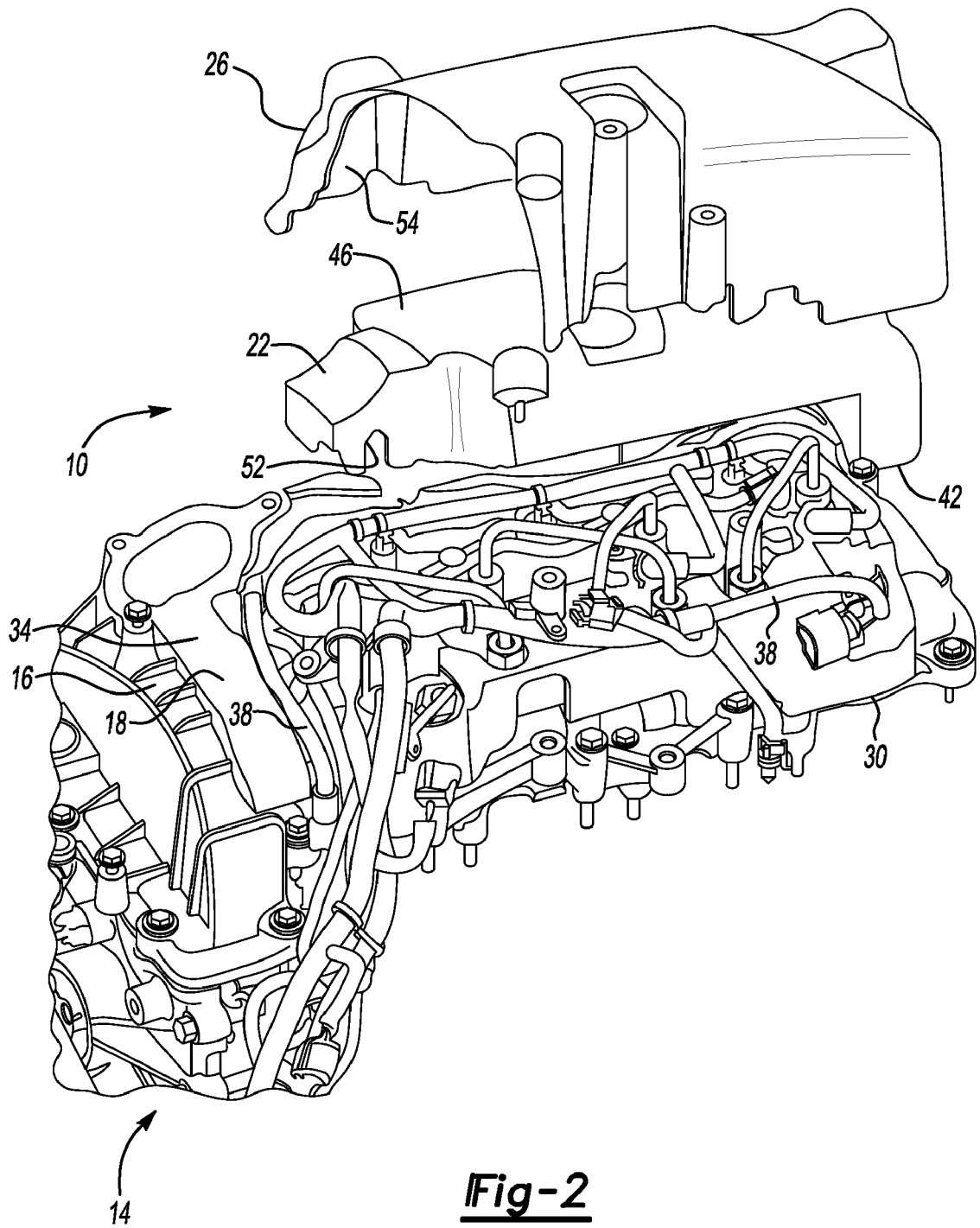
FIG. 2 is a perspective exploded view of an embodiment of the acoustic treatment of the present invention with the internal combustion engine of FIG. 1.

Referring to FIGS. 1 and 2, an example embodiment of an engine acoustic treatment 10 for an engine 14, for example an internal combustion engine (ICE) assembly, is depicted. The engine acoustic treatment 10 includes a base layer 18, a secondary layer 22, and an optional shell 26. The acoustic treatment 10 is indicated in FIG. 1, however FIG. 1 illustrates only the base layer 18 of the acoustic treatment and not the secondary layer 22. Although the acoustic treatment 10 is described herein with respect to an engine 14, it is to be understood that the treatment 10 may be utilized to attenuate noise in any suitable engine or device.

The base layer 18 includes a first base surface 30 and an opposing second base surface 34. The first base surface 30 is configured to mate with a suitable surface of engine 14, for example an engine top surface 16. As non-limiting examples, the first base surface 30 may be configured to mate with a cam cover, a cylinder head, a fuel rail bracket, and/or another engine surface, such as an engine front, side, bottom, and/or V. As used herein, "mate" is to be interpreted broadly to include substantially aligning with or affixing thereto, either removably or non-removably, and may refer to nesting one surface with another having a complimentary contour.

In one example embodiment, the base layer 18 is formed from a substantially deformable material, including, but not limited to, foam, plastic, rubber, or a polymer such as polyurethane. In the example embodiment, the base layer 18 is mated with the exterior surface 16 of the engine via a press-fit, wherein the base layer 18 is placed between the engine 14 and one or more engine components 38. The engine component(s) 38 may include any combination of components, including, but not limited to, wires (e.g., electrical wires), lines (e.g., fuel, water, or other liquid lines), fittings (e.g., wiring harnesses), brackets, and/or fuel rails extending substantially from the engine 14.

When press-fit into place, the base layer 18 is frictionally held in place by the engine components 38. As used herein, a press-fit configuration is achieved by mating the base layer 18 with the exterior surface 16 before assembling components (e.g., engine components 38) over the base layer 18.

In another example embodiment, the base layer 18 and/or the engine 14 is equipped with a positive fastener 40 (shown here as a box to identify a potential location) capable of releasably or non-releasably affixing the base layer 18 to the engine 14. As non-limiting examples, the fastener may include a hook and loop, a snap, a rivet, a screw, a bolt, a pin, a nail, a retaining ring, a snap ring, a ball and socket, a pushpin, a Christmas tree, and/or any other suitable apparatus.

The base layer 18 has a substantially frame-shaped configuration, which is to be interpreted broadly to include a formation having a substantially open central region (or aperture). The base layer 18 is configured to mate substantially around a perimeter of the engine 14 cam cover.

As non-limiting examples, the base layer 18 may be substantially O-shaped, square, rectangular, C-shaped, or L-shaped. It is to be understood with respect to a frame-shaped configuration that an "open central region" merely indicates that some amount of base layer 18 "frame" surrounds an open space. It does not, however, necessitate that the open region must be geometrically centered in the base layer 18.

Figure 3:
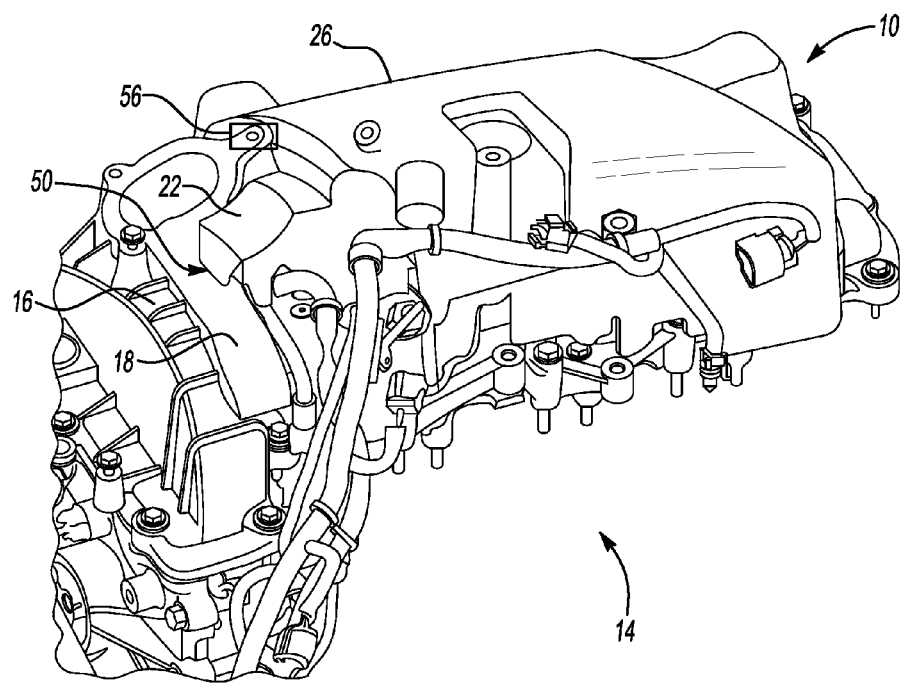
FIG. 3 is a perspective view of the embodiment of the acoustic treatment of FIG. 2 mated with the internal combustion engine of FIG. 1.

As depicted in FIG. 2, the secondary layer 22 includes a secondary layer mating surface 42 and an opposing secondary layer outer surface 46. The secondary layer mating surface 42 is configured to mate with the second base surface 34 at a mating interface 50, as depicted in FIG. 3. The secondary layer 22 may have a closed configuration.

As used herein, with respect to the secondary layer 22, the term "closed" is to be interpreted broadly to indicate a secondary layer 22 having a substantially solid configuration, unlike the open frame-shaped configuration described hereinabove. Accordingly, the base layer 18 is somewhat like a picture frame around the perimeter of a cam cover or other noise-generating component, and the secondary layer 22 is "closed" (i.e. not having any large through-holes) such that it "closes" the central opening of the somewhat picture frame-shaped base layer 18 to trap noise. However, it is to be understood that the base layer 18 and/or the secondary layer 22 may have any suitable shape, including, for example, a closed base layer 18 and/or a frame-shaped secondary layer 22.

Figure 3A:
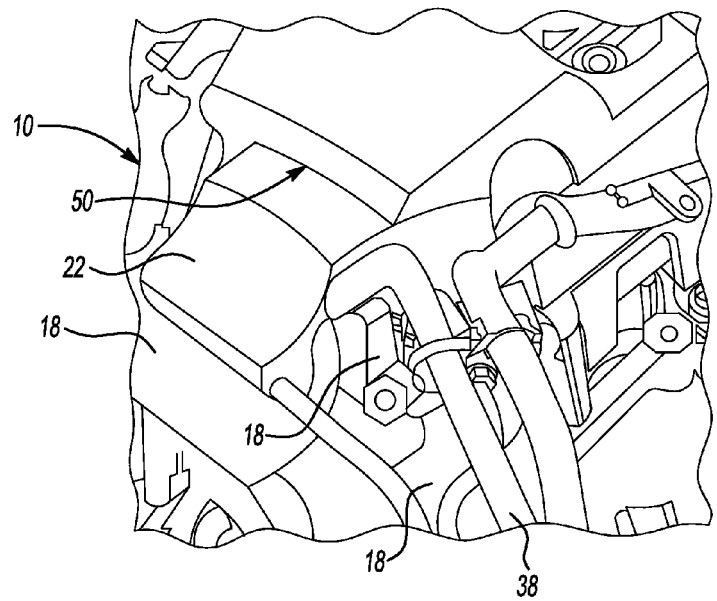
FIG. 3A is an enlarged perspective view of a portion of FIG. 3, with the shell removed, depicting engine component pass-through at the mating interface.

Referring to FIG. 3A, the mating interface 50 provides a pass-through location for the engine components 38. More specifically, the mating interface 50 permits engine components 38 to "pass through" the acoustic treatment 10 (i.e. between the base layer 18 and the secondary layer 22 as illustrated in FIG. 2) while retaining a substantially acoustically-sealed configuration. It is recognized that such an acoustically-sealed configuration having substantially no gaps or cracks reduces noise leakage and improves the high frequency attenuation of the acoustic treatment 10.

In another example embodiment, the base layer 18 and/or the secondary layer 22 are at least partially formed from a deformable material. In the example embodiment, the engine components 38 pass through the mating interface 50 by distorting the deformable material at each specific pass-through location while retaining a substantial acoustic seal.

In yet another example embodiment, the base layer 18 and/or the secondary layer 22, whether produced from a substantially deformable or non-deformable material, is contoured at one or more specific pass-through locations on the mating surface 50. As such, the layer(s) 18, 22 may have a contoured portion 52 (i.e., notch or cutout), as depicted in FIG. 2, at the location where an engine component 38 passes through the acoustic treatment 10. Thus, mating the secondary layer mating surface 42 with the second base surface 34 includes aligning the engine components 38 with a contoured portion 52. Such contouring of the base layer 18 and/or secondary layer 22 may prevent substantial deformation of the layers 18, 22 at the pass-through locations.

A layer 18, 22 may include contoured portions 52 only at the pass-through locations used for a specific engine 14 configuration (i.e., with respect to the location of engine components 38) or, alternatively, a layer 18, 22 may be interchangeable between engine 14 configurations by including contoured portions 52 from more than one engine 14 configuration. When employing the interchangeable layer 18, 22, it is to be understood that contoured portions 52 may be designed to prevent a substantial gap in the acoustic treatment's 10 seal, even if one or more contoured portions 52 are unused with a specific engine 14 configuration.

Referring generally now to FIGS. 1-3A, the acoustic treatment 10 may include the optional shell 26, which substantially covers the secondary layer 22 and, further, may cover at least a portion of the base layer 18. The shell 26 nests with the secondary layer 22 such that a first shell surface 54 mates with the secondary layer outer surface 46. The shell 26 is formed from any suitable material that is sufficiently dense to act as an acoustic barrier. As non-limiting examples, the shell 26 may be formed from a material such as, for example, plastic, fiberglass, rubber, or a polymer such as polyurethane. The shell 26 may be formed from a deformable or non-deformable material. In another example embodiment, the shell 26 is formed from a material having more rigidity and/or a higher density than the base layer 18 and/or the secondary layer 22.

The shell 26 is configured to provide an acoustic barrier to the acoustic treatment 10 by further reducing noise passing therethrough and may be configured to provide structural support to the acoustic treatment 10. The shell 26 may also be configured to maintain the placement of the secondary layer 22 with respect to the engine 14. As such, the shell 26 and/or the engine 14 may be configured with a positive fastener 56 (shown here as a box to identify a potential location) to affix the shell 26, releasably or non-releasably, to the engine 14 while holding the secondary layer 22 substantially in place. The shell 26 may also be configured to provide thermal protection to the base layer 18 and/or the secondary layer 22. As such, the shell 26 may have a higher temperature resistance than at least one of the layers 18, 22.

The placement of the shell 26 with respect to the engine 14 may provide for a relatively large "air gap" between the first shell surface 54 and the engine exterior surface 16. The air gap may range from about 0.10 inch to about 20 inches. More specifically, the air gap may range from about 2 inches to about 4 inches.

In one example embodiment, the air gap is approximately 3 inches. It is recognized that an acoustic treatment 10 with a relatively large air gap may advantageously provide for improved low frequency attenuation with respect to a configuration with a smaller air gap or no air gap. The acoustic treatment 10 substantially reduces the emission of noise at frequency levels as low as approximately 500 Hertz (Hz) and may attenuate noise at frequency levels as low as approximately 300 Hertz (Hz). With respect to high frequency noise, the acoustic treatment 10 may reduce the emission of noise at frequencies up to approximately 20 kiloHertz (kHz).

Figure 4:
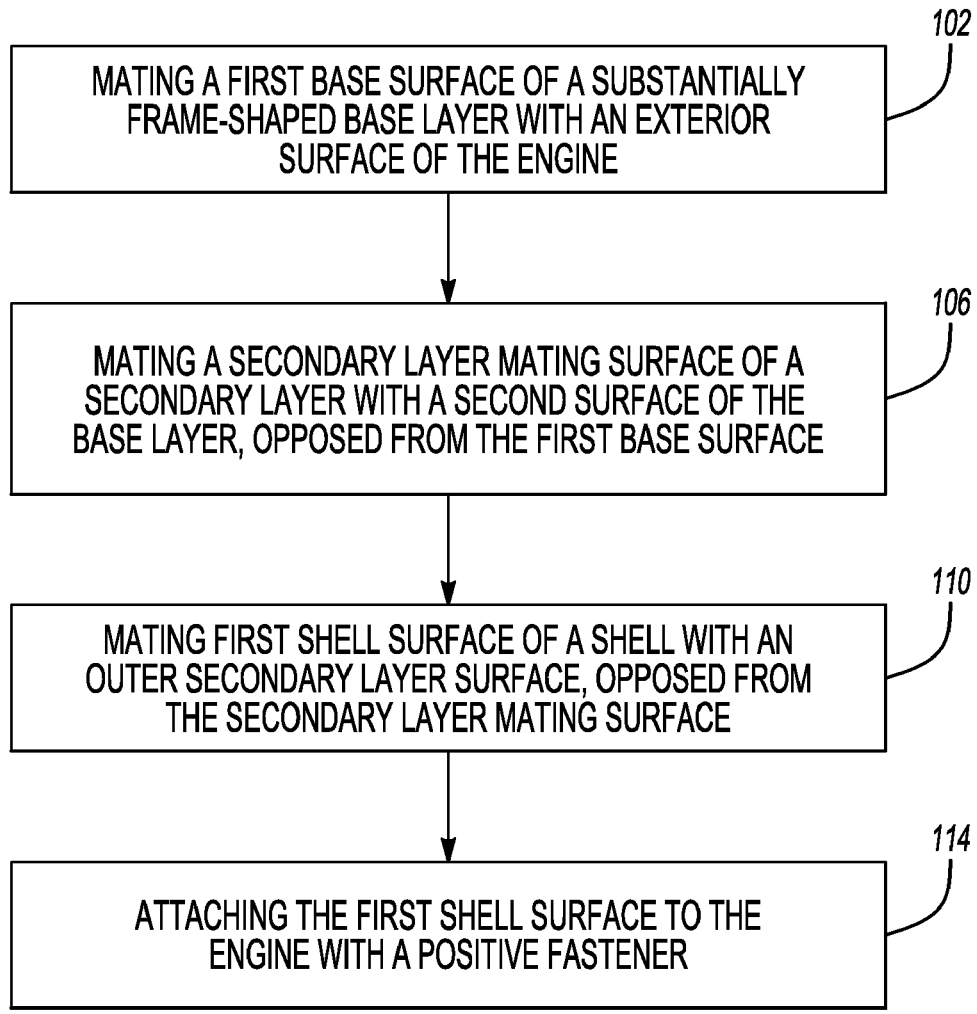
FIG. 4 schematically depicts an embodiment of a method of applying an acoustic treatment to an engine.

FIG. 4 schematically depicts a method of applying an acoustic treatment 10 to an engine 14 having at least one of an engine component 38 extending substantially therefrom. The method includes mating a first base surface 30 of a substantially frame-shaped base layer 18 with an exterior surface 16 of an engine 14, as depicted at reference numeral 102. Further, the method includes mating a secondary layer mating surface 42 of a secondary layer 22 with a second base surface 34 of the base layer 18, opposed from the first base surface 30, as depicted at reference numeral 106. In the example embodiment of FIG. 4, at least one of the engine components 38 passes between the base layer 18 and the secondary layer 22.

The method also includes mating a first shell surface 54 of a closed shell 26 with a secondary layer outer surface 46, opposed from the secondary layer mating surface 42, as depicted at reference numeral 110. The method may also include the step of attaching the first shell surface 54 to the engine 14 with a positive fastener 56, as depicted at reference numeral 114. The shell 26 may be mated with the secondary layer 22 after the secondary layer 22 is mated with the base layer 18 or, alternatively, the secondary layer 22 may be mated with the shell 26 before the secondary layer 22 is mated with the base layer 18.

It is to be understood that the term "top" is used herein to describe direction with respect to FIGS. 1-3A and is not to be used as a limiting term. As such, the term "top" is not to restrict the orientation of the acoustic treatment 10 and engine 14 during manufacture or use.

While the best modes for carrying out the invention have been described in detail, those familiar with the art to which this invention relates will recognize various alternative designs and embodiments for practicing the invention within the scope of the appended claims.

The invention claimed is:

1. An acoustic treatment for an engine having at least one engine component extending substantially therefrom, the acoustic treatment comprising:
   a base layer having a frame shaped configuration defining a substantially open central region with the at least one engine component disposed within the open central region, the base layer having a first base surface contoured to mate with an exterior surface of the engine for providing an acoustic seal between the engine and the base layer, and an opposing second base surface;
   a secondary layer defining a solid configuration covering the open central region of the base layer, the secondary layer having a secondary layer mating surface contoured to mate with the second base surface at a mating interface to provide an acoustic seal about the open central region between the base layer and the secondary layer, with the solid configuration closing the open central region to trap noise between the engine and the secondary layer, the secondary layer further including an opposing secondary layer outer surface; and
   a shell having a first shell surface contoured to mate with the secondary layer outer surface, the shell substantially covering the secondary layer and at least a portion of the base layer, with the shell and the secondary layer spaced from the engine to define an air gap over the open central region between the engine exterior surface and the first shell surface;
   wherein the mating interface provides a pass-through location to permit the at least one engine component to pass from the open central region, between the base layer and the secondary layer, wherein the mating interface is contoured to mate with the at least one engine component to provide an acoustic seal against the at least one engine component.

2. The acoustic treatment of claim 1, wherein at least one of the base layer and the secondary layer is formed from a deformable material.

3. The acoustic treatment of claim 2, wherein the air gap over the open central region between the engine and the closed configuration is at least two inches and less than four inches.

4. The acoustic treatment of claim 3, wherein the shell is formed from at least one of plastic, fiberglass, or rubber.

5. The acoustic treatment of claim 3, wherein the shell includes a positive fastener for attaching the shell to the engine.

6. The acoustic treatment of claim 3, wherein the shell is formed from a material having greater rigidity than at least one of the base layer or the secondary layer.

7. The acoustic treatment of claim 2, wherein at least one of the base layer and the secondary layer is formed from at least one of foam, plastic, or rubber.

8. The acoustic treatment of claim 1, wherein the engine exterior surface includes at least one of a cam cover, a cylinder head, or a fuel rail bracket.

9. The acoustic treatment of claim 1, wherein at least one of the base layer or the secondary layer is contoured to enable the at least one engine component to pass through the mating interface without substantial deformation of the base layer and the secondary layer.

10. A method of applying an acoustic treatment to an engine, the method comprising the steps of:
    mating a first base surface of a base layer defining an open central region with an exterior surface of the engine;
    mating a secondary layer mating surface of a secondary layer with a second base surface of the base layer, opposed from the first base surface, to define a mating interface between the base layer and the secondary layer, wherein the secondary layer has a solid configuration which covers the oven central region of the base layer, and wherein the secondary layer defines an air gap between the engine and the solid configuration; and
    contouring the mating interface of the base layer and the secondary layer to mate with at least one engine component to allow the at least one engine component to pass through the mating interface in acoustically sealed engagement with the base layer and the secondary layer.

11. The method of claim 10, further comprising the step of mating a shell with the secondary layer to thermally protect the secondary layer.

12. The method of claim 11, wherein the shell is mated with the secondary layer before the secondary layer mating surface is mated with the second base surface.

13. The method of claim 11, further comprising the step of attaching the shell to the engine with a positive fastener.

14. The method of claim 10, wherein the exterior surface of the engine comprises at least one of a cam cover, a cylinder head, or a fuel rail bracket.

15. The method of claim 10, wherein mating the first base surface with the exterior surface of the engine includes fitting the base layer between one or more of the at least one engine component and the engine.

16. The method of claim 10, wherein mating the secondary layer mating surface with the second base surface includes aligning the at least one engine component with a contoured portion of at least one of the base layer or the secondary layer.

17. The method of claim 10, wherein mating the secondary layer mating surface with the second base surface includes deforming at least one of the base layer or the secondary layer with the at least one engine component.

18. An engine assembly comprising:
    an internal combustion engine including an acoustic treatment, the internal combustion engine having at least one engine component extending substantially therefrom; and
    the acoustic treatment including:
        a base layer having a frame shaped configuration defining a substantially open central region with the at least one engine component disposed within the open central region, the base layer having a first base surface contoured to mate with an exterior surface of the internal combustion engine to provide an acoustic seal between the internal combustion engine and the base layer, and an opposing second base surface;
        a secondary layer defining a solid configuration covering the open central region of the base layer, the secondary layer having a secondary layer mating surface contoured to mate with the second base surface at a mating interface to provide an acoustic seal about the open central region between the base layer and the secondary layer, with the solid configuration closing the open central region to tap noise between the engine and the secondary layer, the secondary layer further including an opposing secondary layer outer surface; and a shell having a first shell surface contoured to mate with the secondary layer outer surface, the shell substantially covering the secondary layer and at least a portion of the base layer, with the shell and the secondary layer spaced from the engine to define an air gap over the open central region between the engine exterior surface and the first shell surface;

wherein the mating interface provides a pass-through location to permit the at least one engine component to pass from the open central region, between the base layer and the secondary layer, wherein the mating interface is contoured to mate with the at least one engine component to provide an acoustic seal against the at least one engine component.

19. The engine assembly of claim 18, wherein the air gap over the open central region between the closed configuration of the secondary layer and the internal combustion engine is at least two inches and less than four inches.

\* \* \* \* \*